US008855488B2

(12) United States Patent
Hayashi

(10) Patent No.: US 8,855,488 B2
(45) Date of Patent: Oct. 7, 2014

(54) OPTICAL TRANSMISSION SYSTEM

(71) Applicant: Sumitomo Electric Industries, Ltd., Osaka (JP)

(72) Inventor: Tetsuya Hayashi, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 83 days.

(21) Appl. No.: 13/721,593

(22) Filed: Dec. 20, 2012

(65) Prior Publication Data

US 2013/0183033 A1    Jul. 18, 2013

Related U.S. Application Data

(60) Provisional application No. 61/602,706, filed on Feb. 24, 2012.

(30) Foreign Application Priority Data

Dec. 22, 2011  (JP) .................................. 2011-282096
Feb. 24, 2012  (JP) .................................. 2012-038320

(51) Int. Cl.
  *H04B 10/00*  (2013.01)
  *H04B 10/516*  (2013.01)
  *H04J 14/04*  (2006.01)
  *H04B 10/2581*  (2013.01)
  *H04J 14/00*  (2006.01)

(52) U.S. Cl.
  CPC ............. *H04J 14/00* (2013.01); *H04B 10/516* (2013.01); *H04J 14/04* (2013.01); *H04B 10/2581* (2013.01)
  USPC ................................. 398/55; 398/56; 398/57

(58) Field of Classification Search
  CPC ...................................................... H04J 14/0227
  USPC ........................................................ 38/55–57
  See application file for complete search history.

(56) References Cited

U.S. PATENT DOCUMENTS 5,471,332  A  * 11/1995  Shiragaki et al. ............... 398/45
2007/0041066  A1 *  2/2007  Yasuda et al. .................... 359/9
2009/0274470  A1 * 11/2009  Yoshino et al. ............... 398/183

FOREIGN PATENT DOCUMENTS

JP   2007-43672    2/2007
WO   2008/050729   5/2008

(Continued)

OTHER PUBLICATIONS

P.J. Winzer et al., "Penalties from In-Band Crosstalk for Advanced Optical Modulation Formats," ECOC Technical Digest, Sep. 22, 2011, Tu.5.B.7.pdf, 4 pages.

(Continued)

*Primary Examiner* — Danny Leung
(74) *Attorney, Agent, or Firm* — Drinker Biddle & Reath LLP

(57) ABSTRACT

The present invention relates to an optical transmission system to which a spatial multiplexing optical fiber is applied as a transmission line. The optical transmission system performs optical transmission using the spatial multiplexing optical fiber as an optical transmission line for transmission of signal light. Namely, the optical transmission is carried out in accordance with a modulation format in which a Q-factor of the signal light propagating in certain propagation mode light propagating in the spatial multiplexing optical fiber and a ratio of a signal light power to a square of the shortest distance between modulation symbols in the modulation format satisfy a predetermined relational expression.

26 Claims, 8 Drawing Sheets

(56) References Cited

FOREIGN PATENT DOCUMENTS

| WO | 2010/082656 | 7/2010 |
|---|---|---|
| WO | 2011/004836 | 1/2011 |

OTHER PUBLICATIONS

Tetsuya Hayashi et al., "Design and fabrication of ultra-low crosstalk and low-loss multi-core fiber," Optics Express, Aug. 15, 2011, pp. 16576-16592, vol. 19, No. 17.

International Telecommunication Union, "Series G: Transmission Systems and Media, Digital Systems and Networks," Digital sections and digital line system—Optical fibre submarine cable systems, ITU-T Recommendation G.975.1, Feb. 2004, pp. 1-50.

Henning Bülow et al., "Coded Modulation in Optical Communications," Optical Society of America, OSA/OFC/NFOEC, 2011, OTh01.pdf, 3 pages.

English-language translation of International Preliminary Report on Patentability (IPRP) dated Jul. 3, 2014 that issued in WO Patent Application No. PCT/JP2012/082698.

* cited by examiner

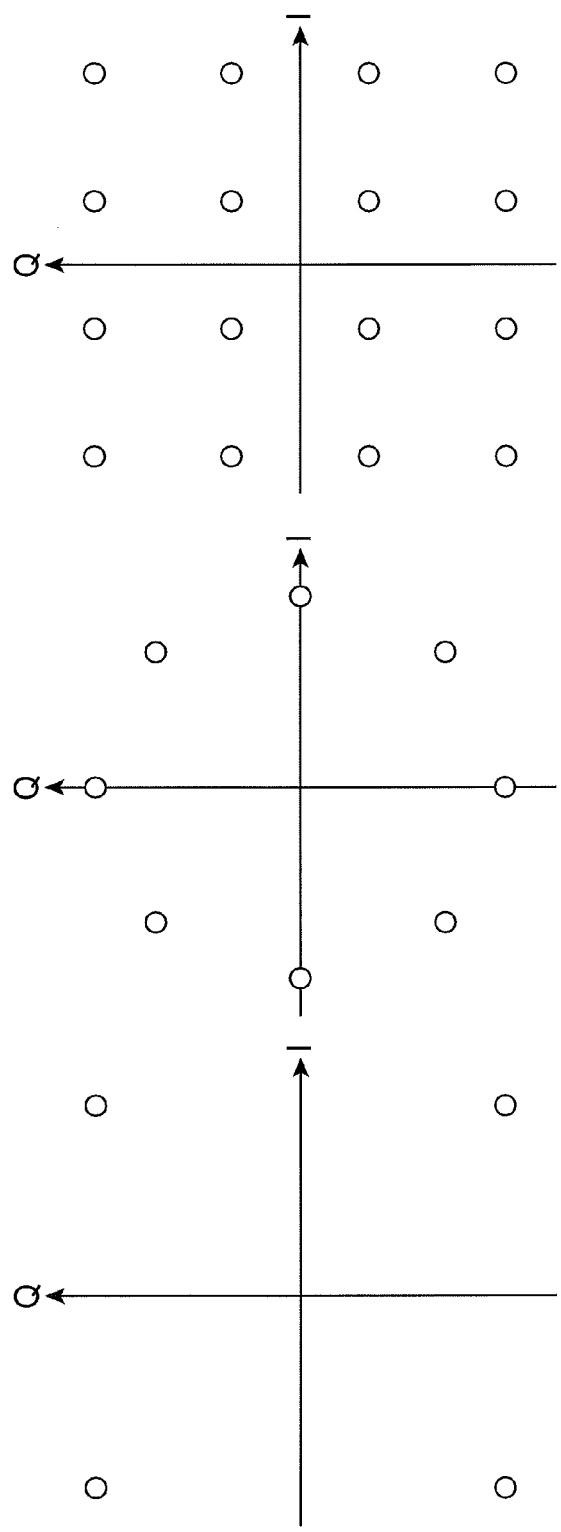

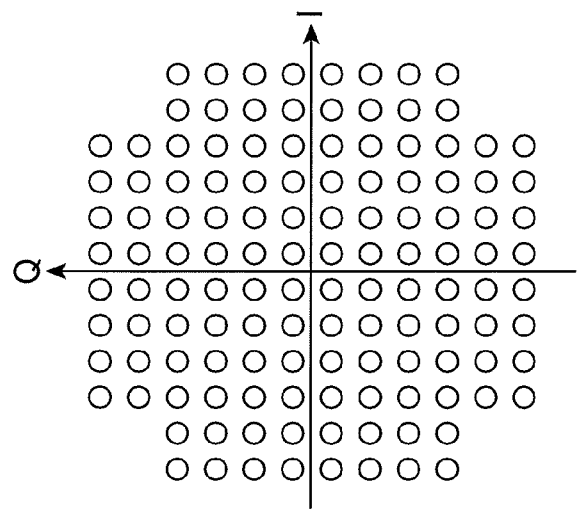
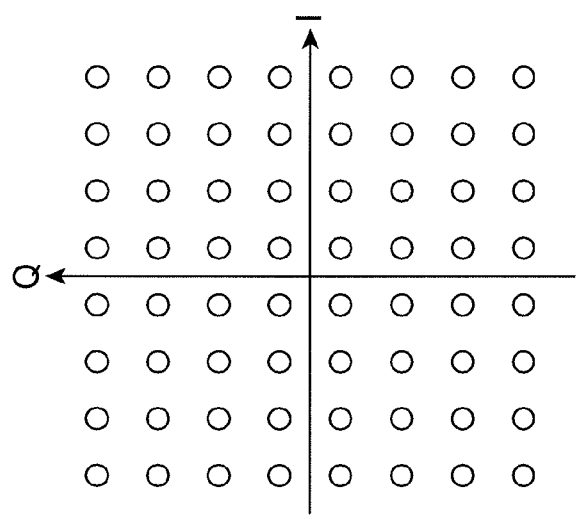
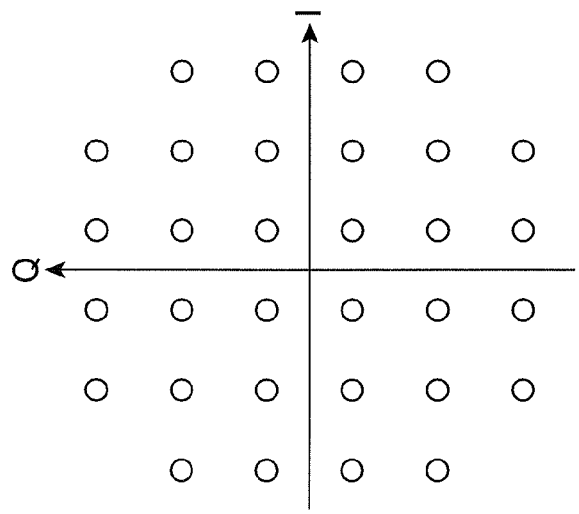

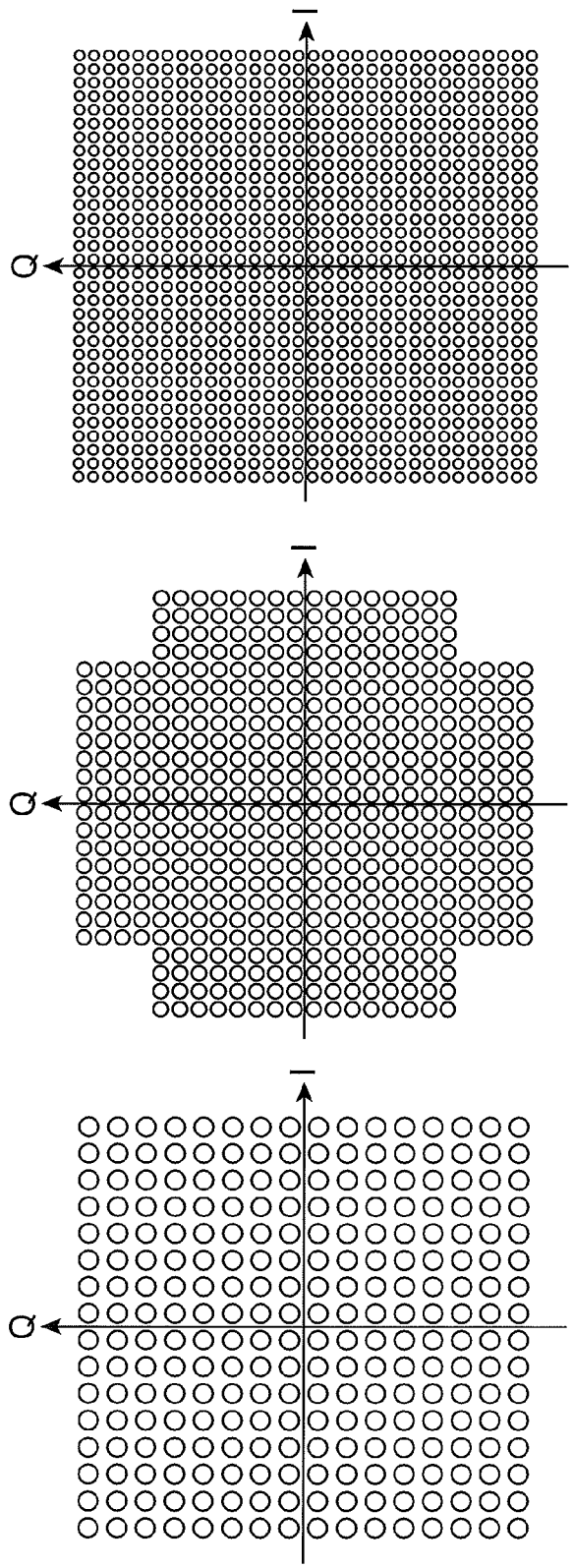

Fig.6

| | $S^2/P_{FS}$ | $P_{avg}/P_{FS}$ | $P_{max}/P_{FS}$ |
|---|---|---|---|
| PM-QPSK | 1 | 1 | 1 |
| PM-8PSK | $(2^{1/2}-1)/2^{1/2}$ | $(2^{1/2}-1)/2^{1/2}$ | 1 |
| PM-16QAM | 1/9 | 5/9 | 1 |
| PM-32QAM | 1/25 | 10/25 | 17/25 |
| PM-64QAM | 1/49 | 21/49 | 1 |
| PM-128QAM | 1/121 | 41/121 | 85/121 |
| PM-256QAM | 1/225 | 85/225 | 1 |
| PM-512QAM | 1/529 | 165/529 | 377/529 |
| PM-1024QAM | 1/961 | 341/961 | 1 |

OPTICAL TRANSMISSION SYSTEM

This application claims the benefit of U.S. Provisional Application No. 61/602,706, filed Feb. 24, 2012, which is incorporated by reference herein in its entirety.

BACKGROUND OF THE INVENTION

1. Field of the Invention

The present invention relates to an optical transmission system to perform optical transmission using a spatial multiplexing optical fiber as an optical transmission line for transmission of signal light.

2. Related Background Art

A multi-core optical fiber (MCF: Multi-Core optical Fiber) is an optical fiber in which a plurality of cores each capable of guiding light beam in a propagation mode are covered by a common cladding. A multi-mode optical fiber (MMF: Multi-Mode optical Fiber) is also called a few-mode optical fiber (FMF: Few-Mode optical Fiber) and can guide light beams in a plurality of propagation mode through one core. These optical fibers are generally called spatial multiplexing optical fibers.

An optical transmission system to perform optical transmission using a spatial multiplexing optical fiber as an optical transmission line for transmission of signal light can guide light in multiple propagation modes by the spatial multiplexing optical fiber. For this reason, it is able to transmit and receive a large volume of information when compared to the case where a single-mode optical fiber is used as an optical transmission line.

In the optical transmission system using the spatial multiplexing optical fiber as an optical transmission line, crosstalk (XT) between multiple propagation modes raises a problem. P. J. Winzer et al., ECOC 2011, paper Tu. 5. B. 7 (Non Patent Document 1) reports the effect of XT between propagation modes on transmission quality Q-factor in MCF.

SUMMARY OF THE INVENTION

The inventor conducted research on the conventional optical transmission systems and found the problem as described below.

Namely, XT between propagation modes in the spatial multiplexing optical fiber actually has dispersion in a certain distribution. However, Non Patent Document 1 assumes that XT is constant, without consideration to statistical dispersion of XT between propagation modes in simulations and experiments, and fails to accurately clarify the effect of XT on the transmission quality Q-factor. For this reason, it is not easy to perform high-quality signal light transmission in the optical transmission system to perform optical transmission using the spatial multiplexing optical fiber.

The present invention has been accomplished in order to solve the above-described problem and it is an object of the present invention to provide an optical transmission system capable of performing high-quality signal light transmission using the spatial multiplexing optical fiber.

An optical transmission system according to the present invention is an optical transmission system to perform optical transmission using a spatial multiplexing optical fiber as an optical transmission line for transmission of signal light, which comprises the spatial multiplexing optical fiber, and a transmitting system and a receiving system arranged with the spatial multiplexing optical fiber in between. The transmitting system has a light source, and a modulator to generate signal light by modulating light emitted from the light source, in accordance with a predetermined modulation format.

Particularly, the optical transmission system according to a first aspect modulates the light emitted from the light source, in accordance with the modulation format set as described below. Namely, when a signal light power is defined as $P_{signal}$, the shortest distance between modulation symbols in a modulation diagram showing a signal arrangement of the modulation format, as S, and a signal light intensity ratio PSR between the modulation symbols as $PSR=P_{signal}/S^2$, under conditions that a transmission quality Q-factor$^S$ (Which will be referred to hereinafter simply as Q-factor) necessary for forward error correction (FEC: Forward Error Correction) in the optical transmission is $Q_{FEC}$, a margin of the Q-factor desired for safety in the optical transmission is $Q_{margin}$, a mean crosstalk to a certain propagation mode of the spatial multiplexing optical fiber is $XT_\mu$, and the Q-factor of the signal, which propagates in only the certain propagation mode of the spatial multiplexing optical fiber after modulation in accordance with the set modulation format, is $Q_{noise}$, PSR falls within the range of not more than $PSR_{max}$ in Equation (1) below and not less than $PSR_{max}(2^{1/2}-1)/2^{1/2}$.

$$PSR_{max} = \frac{1}{XT_\mu}\left(\frac{1}{Q_{FEC}^2 Q_{margin}^2} - \frac{1}{Q_{noise}^2}\right) \quad (1)$$

The optical transmission system according to a second aspect modulates the light emitted from the light source, in accordance with the modulation format set as described below. Namely, when a signal light power is defined as $P_{signal}$, the shortest distance between modulation symbols in a modulation diagram showing a signal arrangement of the modulation format, as S, and a signal light intensity ratio PSR between the modulation symbols as $PSR=P_{signal}/S^2$, under conditions that a Q-factor necessary for forward error correction in the optical transmission is $Q_{FEC}$, a margin of the Q-factor desired for safety in the optical transmission is $Q_{margin}$, a mean crosstalk to a certain propagation mode of the spatial multiplexing optical fiber is $XT_\mu$, and the Q-factor of the signal light which propagates in only the certain propagation mode of the spatial multiplexing optical fiber after modulation in accordance with the modulation format of polarization multiplexing (PM)-quadrature phase shift keying (QPSK) (which will be referred to as PM-QPSK modulation format), is $Q_{PM-QPSK}$, PSR falls within the range of not more than $PSR_{max}$ in Equation (2) below and not less than $PSR_{max}(2^{1/2}-1)/2^{1/2}$.

$$PSR_{max} = \frac{1}{Q_{PM-QPSK}^{-2} + XT_\mu} \frac{1}{Q_{FEC}^2 Q_{margin}^2} \quad (2)$$

As a third aspect applicable to the first or second aspect, preferably, the Q-factor $Q_{FEC}$ necessary for the error correction satisfies Expression (3) below and the margin $Q_{margin}$ of the Q-factor satisfies Expression (4) below.

$$10 \log_{10} Q_{FEC} \leq 9.8 \quad (3)$$

$$1 \leq 10 \log_{10} Q_{margin} \leq 6 \quad (4)$$

The optical transmission system according to a fourth aspect modulates the light emitted from the light source, in accordance with the modulation format set as described below. Namely, when a signal light power is defined as $P_{signal}$, the shortest distance between modulation symbols in a modulation diagram showing a signal arrangement of the modulation format, as S, and a signal light intensity ratio PSR between the modulation symbols as $PSR = P_{signal}/S^2$, under a condition that a mean crosstalk to a certain propagation mode of the spatial multiplexing optical fiber is $XT_\mu$, PSR falls within the range of not more than $PSR_{max}$ in Equation (5) below and not less than $PSR_{max}(2^{1/2}-1)/2^{1/2}$.

$$PSR_{max} = \frac{1}{XT_\mu} 10^{\frac{-6.5}{10}} (10^{\frac{-1}{10}} - 10^{\frac{-3}{10}}) \quad (5)$$

The optical transmission system according to a fifth aspect modulates the light emitted from the light source, in accordance with the modulation format set as described below. Namely, when a signal light power is defined as $P_{signal}$, the shortest distance between modulation symbols in a modulation diagram showing a signal arrangement of the modulation format, as S, and a signal light intensity ratio PSR between the modulation symbols as $PSR = P_{signal}/S^2$, under a condition that a mean crosstalk to a certain propagation mode of the spatial multiplexing optical fiber is $XT_\mu$, PSR falls within the range of not more than $PSR_{max}$ in Equation (6) below and not less than $PSR_{max}(2^{1/2}-1)/2^{1/2}$.

$$PSR_{max} = \frac{1}{XT_\mu} 10^{\frac{-8.5}{10}} (10^{\frac{-1}{10}} - 10^{\frac{-3}{10}}) \quad (6)$$

As a sixth aspect applicable to at least any one of the first to fifth aspects, the modulation format after the PSR is set to be not more than $PSR_{max}$, is preferably a polarization-switched modulation format.

Furthermore, as a seventh aspect applicable to at least any one of the first to sixth aspects, the signal light power $P_{signal}$ is preferably an average power of the light emitted from the light source.

As an eighth aspect applicable to at least any one of the first to fifth aspects, $P_{signal}$ is preferably an average power of the light emitted from the light source. In this eighth aspect, the modulation format to be employed is PM-QPSK when $PSR_{max}$ is not less than 1 and is less than $2^{1/2}/(2^{1/2}-1)$. When $PSR_{max}$ is not less than $2^{1/2}/(2^{1/2}-1)$ and is less than 5, the modulation format to be employed is polarization multiplexing—8 phase shift keying (which will be referred to hereinafter as PM-8PSK). When $PSR_{max}$ is not less than 5 and is less than 10, the modulation format to be employed is PM-16QAM among polarization multiplexing—multi-level quadrature amplitude modulations (M-QAM). When $PSR_{max}$ is not less than 10 and is less than 21, the modulation format to be employed is PM-32QAM. When $PSR_{max}$ is not less than 21 and is less than 41, the modulation format to be employed is PM-64QAM. When $PSR_{max}$ is not less than 41 and is less than 85, the modulation format to be employed is PM-128QAM. When $PSR_{max}$ is not less than 85 and is less than 165, the modulation format to be employed is PM-256QAM. When $PSR_{max}$ is not less than 165 and is less than 341, the modulation format to be employed is PM-512QAM. When $PSR_{max}$ is not less than 341, the modulation format to be employed is PM-1024QAM.

As a ninth aspect applicable to at least any one of the first, and the third to sixth aspects, the signal light power $P_{signal}$ is preferably a maximum power of the light emitted from the light source.

Furthermore, as a tenth aspect applicable to at least any one of the first, and the third to fifth aspects, the signal light power $P_{signal}$ is preferably a maximum power of the light emitted from the light source. In this tenth aspect, the modulation format to be employed is PM-QPSK when $PSR_{max}$ is not less than 1 and is less than $2^{1/2}/(2^{1/2}-1)$. When $PSR_{max}$ is not less than $2^{1/2}/(2^{1/2}-1)$ and is less than 9, the modulation format to be employed is PM-8PSK. When $PSR_{max}$ is not less than 9 and is less than 17, the modulation format to be employed is PM-16QAM. When $PSR_{max}$ is not less than 17 and is less than 49, the modulation format to be employed is PM-32QAM. When $PSR_{max}$ is not less than 49 and is less than 85, the modulation format to be employed is PM-64QAM. When $PSR_{max}$ is not less than 85 and is less than 225, the modulation format to be employed is PM-128QAM. When $PSR_{max}$ is not less than 225 and is less than 377, the modulation format to be employed is PM-256QAM. When $PSR_{max}$ is not less than 377 and is less than 961, the modulation format to be employed is PM-512QAM. When $PSR_{max}$ is not less than 961, the modulation format to be employed is PM-1024QAM.

BRIEF DESCRIPTION OF THE DRAWINGS

FIGS. 3A to 3C are modulation diagrams showing signal arrangements of various modulation formats (PM-QPSK, PM-PSK, and PM-16QAM);

FIGS. 4A to 4C are modulation diagrams showing signal arrangements of various modulation formats (PM-32QAM, PM-64QAM, and PM-128QAM);

FIGS. 5A to 5C are modulation diagrams showing signal arrangements of various modulation formats (PM-256QAM, PM-512QAM, and PM-1024QAM);

FIG. 6 is a table showing a list of ratios of $S^2$, $P_{avg}$, and $P_{max}$ in each of modulation formats, to maximum power $P_{FS}$ in full-scale modulation over a modulation range of a modulator;

DESCRIPTION OF THE PREFERRED EMBODIMENTS

Embodiments of the present invention will be described below in detail with reference to the accompanying drawings. The same elements will be denoted by the same reference signs in the description of the drawings, without redundant description.

Figure 1:
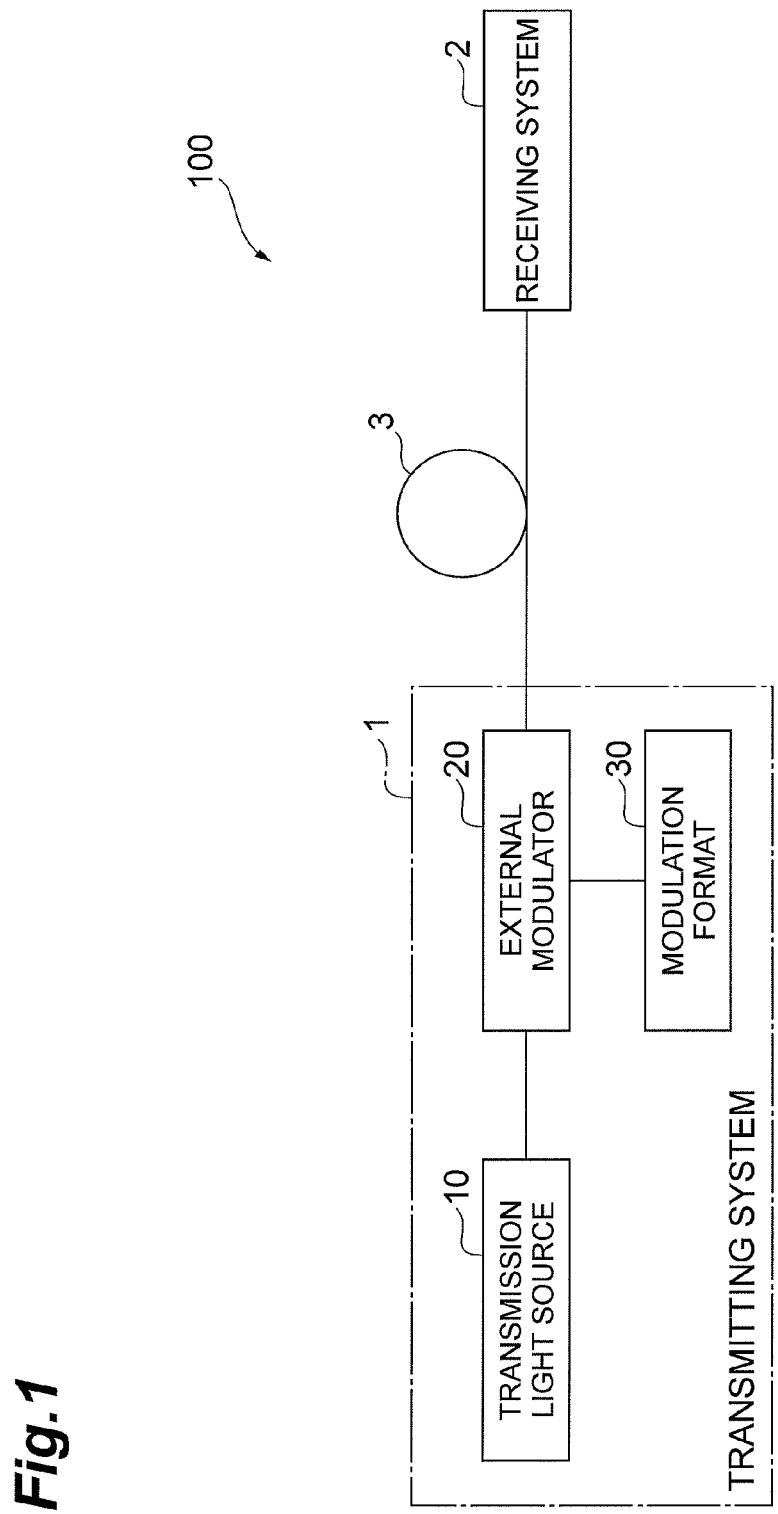
FIG. 1 is a drawing showing a schematic configuration of an optical transmission system according to an embodiment of the present invention.

FIG. 1 is a drawing showing a schematic configuration of an optical transmission system 100 according to an embodiment of the present invention. In FIG. 1, the optical transmission system 100 is provided with a transmitting system 1, a receiving system 2, and a spatial multiplexing optical fiber 3 as a transmission line disposed between the transmitting system 1 and the receiving system 2. The transmitting system 1 has a transmission light source 10 to emit light, and an external modulator 20 to generate the signal light by modulating the light emitted from the transmission light source 10, in accordance with a predetermined modulation format 30.

Figure 2:
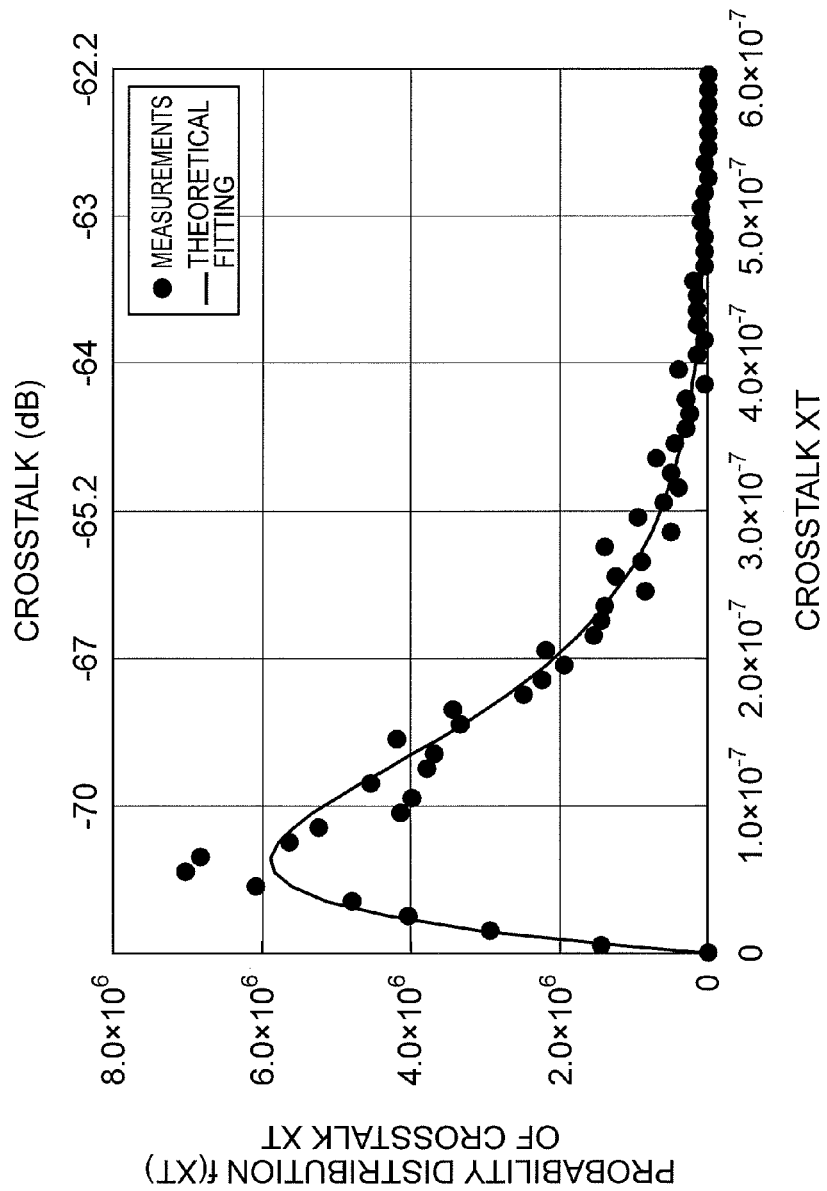
FIG. 2 is a graph showing a statistical distribution of crosstalk XT between propagation modes in an optical transmission system to perform optical transmission using a spatial multiplexing optical fiber as an optical transmission line for transmission of signal light.

FIG. 2 is a graph showing a statistical distribution of crosstalk XT between propagation modes in the optical transmission system to perform optical transmission through the use of the spatial multiplexing optical fiber as an optical transmission line for transmission of signal light. FIG. 2 is the graph shown in T. Hayashi, et al., Opt. Express, vol. 19, no. 17, pp. 16576-16592 (2011) (Non Patent Document 2) and shows the statistical distribution of crosstalk XT in use of MCF as the spatial multiplexing optical fiber.

As shown in FIG. 2, the crosstalk XT between propagation modes has statistical dispersion. The probability distribution f(XT) of crosstalk XT is expressed by Equation (7) below. This probability distribution f(XT) is represented by a chi-square distribution with four degrees of freedom scaled by a certain value $\sigma^2$. A mean value of the probability distribution f(XT) (i.e., a mean crosstalk) $XT_\mu$ is represented by Equation (8) below.

$$f(XT) = \frac{XT}{4\sigma^4} \exp\left(-\frac{XT}{2\sigma^2}\right) \tag{7}$$

$$XT_\mu = 4\sigma^2 \tag{8}$$

In general, a chi-square distribution with four degrees of freedom is a probability distribution of a sum of squares of four random variables each normally distributed with variance $\sigma^2$. Since one propagation mode includes two polarization modes orthogonal to each other, the crosstalk XT can be expressed by a sum of squares (powers) of a total of four amplitude components of respective In-phase components (I components) and Quadrature components (Q components) of the two polarization modes orthogonal to each other. From this fact, that the crosstalk XT disperses in the chi-square distribution with four degrees of freedom represented by Equation (7) above indicates that each of the I components and Q components of the respective polarization modes of the crosstalk XT disperses in a normal distribution with variance $\sigma^2$.

The present invention clarifies the effect of the crosstalk XT on the transmission quality Q-factor with consideration to the statistical dispersion of crosstalk XT in the spatial multiplexing optical fiber such as MCF or FMF, and provides the optical transmission system capable of setting a multi-level modulation format to enable transmission in the spatial multiplexing optical fiber, from the crosstalk XT between propagation modes and the Q-factor in transmission through one propagation mode.

The crosstalk XT between propagation modes in the spatial multiplexing optical fiber is considered to take random values in the probability distribution of the normal distributions on the I-Q plane of I components and Q components varying depending upon dispersion of phase difference between propagation modes. From this, by regarding the crosstalk XT as noise, it is feasible to calculate the effect of the crosstalk XT on the transmission quality Q-factor in the modulation such as PSK or QAM.

Particularly, when signals are uncorrelated between propagation modes, the phase difference between propagation modes varies with time and the crosstalk XT is also considered to vary with time; therefore, it is considered that the crosstalk XT can be regarded as random noise. Non Patent Document 2 treats of only MCF, but, in the case of FMF, as in the case of MCF, the inter-mode phase difference is considered to be random mode coupling and it is thus considered that the crosstalk XT can be regarded as random noise.

The Q-factor is defined by Equation (9) below (cf. ITU-T Recommendation G.975.1, 2004 (Non Patent Document 3)). In this equation, $\mu_1$ and $\mu_2$ are respective mean positions of two neighboring modulation symbols (each of the modulation symbols fluctuates due to noise components in the signal light), out of multiple modulation symbols on the I-Q plane, and $\sigma_1$ and $\sigma_2$ respective standard deviations of the two neighboring modulation symbols. For reference, the generally-used decibel expression of Q-factor is the one with the coefficient of 20 as in the case of voltage or the like, as shown in Equation (10) below, while the expression by $Q^2$-factor often seen in papers and others is used in order to prevent coefficient error in the below equation. The Q-factor and $Q^2$-factor are the same on the decibel base.

$$Q = \frac{|\mu_1 - \mu_2|}{\sigma_1 + \sigma_2} \tag{9}$$

$$Q_{dB} = 20\log_{10}Q = 10\log_{10}Q^2 \tag{10}$$

From Eq (9) above, when the standard deviations of noises in the respective modulation symbols are assumed to equal, the $Q^2$-factor for noise without the crosstalk XT is expressed by Equation (11) below. In this equation, S represents the shortest distance between modulation symbols ($|\mu_1-\mu_2|$). Supposing noise is normally distributed with variance a $\sigma_{noise}^2$ on the I-Q plane of two x/y polarizations, $4\sigma_{noise}^2$ corresponds to an average power $P_{noise}$ of noise.

$$Q_{noise}^2 = \left(\frac{|\mu_1 - \mu_2|}{\sigma_{noise,1} + \sigma_{noise,2}}\right)^2 = \frac{S^2}{4\sigma_{noise}^2} \tag{11}$$

The mean crosstalk $XT_\mu$ in a certain propagation mode (which is "a propagation mode of a certain core out of a plurality of cores" in the case of MCF or which is "a certain propagation mode out of a plurality of propagation modes in one core" in the case of FMF) is defined as in Equation (12) below. Furthermore, the crosstalk XT takes random values in the probability distribution of normal distributions on the I-Q plane and a relation between mean crosstalk $XT_\mu$ and variance $\sigma_4^2$ of the normal distributions is represented by Equation (13) below.

$$XT_\mu = \frac{\text{average power of incident light except pertinent mode, in pertinent mode}}{\text{average power of incident light in pertinent mode, in pertinent mode}} = \frac{XT \text{ light power}}{\text{signal light power}} \tag{12}$$

$$XT_\mu = 4\sigma_4^2 \tag{13}$$

Therefore, the variance $\sigma_{xt}^2$ on the I-Q plane of optical power of crosstalk XT is represented by Equation (14) below. Accordingly, the $Q^2$-factor for noise with the crosstalk XT is represented by Equation (15) below. In this case, $Q^2$ penalty due to the crosstalk XT is represented by Equation (16) below.

$$\sigma_{xt}^2 = P_{signal} XT_\mu / 4 \tag{14}$$

$$Q_{noise+xt}^2 = \frac{S^2}{4(\sigma_{noise}^2 + \sigma_{xt}^2)} = \left(\frac{1}{Q_{noise}^2} + \frac{P_{signal}}{S^2} XT_\mu\right)^{-1} \tag{15}$$

$$\frac{Q_{noise}^2}{Q_{noise+xt}^2} = 1 + Q_{noise}^2 \frac{P_{signal}}{S^2} XT_\mu = \left(1 - Q_{noise+xt}^2 \frac{P_{signal}}{S^2} XT_\mu\right)^{-1} \tag{16}$$

When the Q-factor necessary for forward error correction is defined as $Q_{FEC}$ and a margin of Q-factor for safety to cope with degradation of Q-factor due to increase of loss with environmental variation or due to increase of loss by re-connection in the event of disconnection is defined as $Q_{margin}$, it is necessary to satisfy Expression (17) below. This Expression (17) can be expressed as Expression (18) below in decibel expression.

$$Q_{noise+xt}^2 \geq Q_{FEC}^2 Q_{margin}^2 \tag{17}$$

$$Q_{noise+xt}^2(dB) \geq Q_{FEC}^2(dB) + Q_{margin}^2(dB) \tag{18}$$

$P_{signal}/S^2$ in each of Eq (15) and Eq (16) above is the value dependent upon the modulation format of signal and therefore, once we know $Q_{noise}^2$ being the $Q^2$-factor when transmitting the signal light in only one propagation mode and the mean crosstalk $XT_\mu$, we can predict $Q_{noise+xt}^2$ being the $Q^2$-factor when transmitting the signal lights in all the remaining propagation modes. For example, in the case of MCF, once we know $Q_{noise}^2$ being the $Q^2$-factor when transmitting the signal light in only one core and the mean crosstalk $XT_\mu$, we can predict $Q_{noise+xt}^2$ being the $Q^2$-factor in transmission of respective signals in all the remaining cores. Furthermore, since it is considered that Expression (17) above is demanded, it is seen that the signals need to be transmitted according to a modulation format satisfying Expression (19) below.

$$\frac{P_{signal}}{S^2} \leq PSR_{max} = \frac{1}{XT_\mu}\left(\frac{1}{Q_{FEC}^2 Q_{margin}^2} - \frac{1}{Q_{noise}^2}\right) \tag{19}$$

FIGS. 3A-3C to FIGS. 5A-5C are drawings showing modulation diagrams (which are also referred to as phase plane diagrams or constellations) indicating signal arrangements of various modulation formats. FIG. 3A is a modulation diagram showing a signal arrangement of a PM-QPSK modulation format, FIG. 3B a modulation diagram showing a signal arrangement of a PM-8PSK modulation format, and FIG. 3C a modulation diagram showing a signal arrangement of a PM-16QAM modulation format. FIG. 4A is a modulation diagram showing a signal arrangement of a PM-32QAM modulation format, FIG. 4B a modulation diagram showing a signal arrangement of a PM-64QAM modulation format, and FIG. 4C a modulation diagram showing a signal arrangement of a PM-128QAM modulation format. FIG. 5A is a modulation diagram showing a signal arrangement of a PM-256QAM modulation format, FIG. 5B a modulation diagram showing a signal arrangement of a PM-512QAM modulation format, and FIG. 5C a modulation diagram showing a signal arrangement of a PM-1024QAM modulation format.

In these modulation diagrams, when the signal light power $P_{signal}$ is assumed to be a maximum power $P_{max}$ in each modulation diagram, $P_{signal}/S^2 = P_{max}/S^2$ becomes 1 in polarization multiplexing (PM) QPSK(PM-QPSK), $2^{1/2}/(2^{1/2}-1)$ in PM-8PSK, 9 in PM-16QAM, 17 in PM-32QAM, 49 in PM-64QAM, 85 in PM-128QAM, 225 in PM-256QAM, 377 in PM-512QAM, or 961 in PM-1024QAM.

When the signal light power $P_{signal}$ is assumed to be an average power $P_{avg}$ in each modulation diagram, $P_{signal}/S^2 = P_{avg}/S^2$ becomes 1 in PM-QPSK, $2^{1/2}/(2^{1/2}-1)$ in PM-8PSK, 5 in PM-16QAM, 10 in PM-32QAM, 21 in PM-64QAM, 41 in PM-128QAM, 85 in PM-256QAM, 165 in PM-512QAM, or 341 in PM-1024QAM.

FIG. 6 is a table showing a list of ratios of $S^2$, $P_{avg}$, and $P_{max}$ in each of the modulation formats, to a maximum power $P_{FS}$ in full-scale modulation over the modulation range of the external modulator 20. In each of PM-32QAM, PM-128QAM, and PM-512QAM, $P_{max} < P_{FS}$, as seen from the fact that there are no modulation symbols at the corners of the modulation diagram.

As it is considered in actual execution of transmission experiments using MCF that the signal lights in the respective cores are uncorrelated and that there occurs a skew between cores due to various perturbations to vary symbols of neighboring cores contributing to the crosstalk XT depending upon fiber longitudinal positions, the case where the signal light power $P_{signal}$ is assumed to be the average power in each modulation diagram is considered to be more practical, but, for higher safety, it can also be said that it is preferable to adopt the case where the signal light power $P_{signal}$ is assumed to be the maximum power in each modulation diagram.

Since $Q_{noise}$ in each modulation is represented by Equation (20) below using $Q_{PM-QPSK}$ serving as $Q_{noise}$ when using PM-QPSK as a modulation format, when the signal light power $P_{signal}$ is assumed to be the average power $P_{avg}$ in each modulation diagram, it is seen that it is necessary to transmit signals in accordance with the modulation format satisfying Expression (21) below, from Equation (15) and Expression (17) above.

$$Q_{noise}^2 = \frac{S^2}{P_{avg}} Q_{PM-QPSK}^2 \tag{20}$$

$$\frac{P_{signal}}{S^2} \leq PSR_{max} = \frac{1}{Q_{PM-QPSK}^{-2} + XT_\mu} \frac{1}{Q_{FEC}^2 Q_{margin}^2} \tag{21}$$

In the present invention, an increase of $PSR_{max}$ allows selection of a modulation format with larger PSR, which can improve frequency utilization efficiency and transmission capacity; therefore, $PSR_{max}$ is preferably as large as possible. In either case of Expression (19) and Expression (21), the smaller $Q_{FEC}$, the larger $PSR_{max}$; therefore, $Q_{FEC}$ is preferably as small as possible. $Q_{FEC}$ preferably satisfies at least Expression (22) below, more preferably satisfies Expression (23) below, and still more preferably satisfies Expression (24) below.

$$10 \log_{10} Q_{FEC} \leq 9.8 \tag{22}$$

$$10 \log_{10} Q_{FEC} \leq 8.5 \tag{23}$$

$$10 \log_{10} Q_{FEC} \leq 7 \tag{24}$$

Since $PSR_{max}$ increases with decrease of $Q_{margin}$, $Q_{margin}$ is also preferably as small as possible; however, if it is too small, the transmission quality Q-factor can become lower than $Q_{FEC}$ because of factors such as disturbance, so as to possibly cause transmission error. Then, $Q_{margin}$ preferably satisfies Expression (25) below, in terms of a balance between improvement of $PSR_{max}$ and suppression of transmission error.

$$10 \log_{10} Q_{margin} \leq 6 \tag{25}$$

Since a relation of $Q_{noise}$ with a margin $Q_{margin1}$ (which is not $Q_{margin}$) for $Q_{FEC}$ can be represented by Equation (26) below, the aforementioned Expression (19) can be rewritten into Expression (27) below.

$$Q_{noise} = Q_{FEC} Q_{margin1} \quad (26)$$

$$\frac{P_{signal}}{S^2} \le PSR_{max} = \frac{1}{XT_\mu} \frac{1}{Q^2_{FEC}} \left( \frac{1}{Q^2_{margin}} - \frac{1}{Q^2_{margin1}} \right) \quad (27)$$

When $Q_{margin1}$ in transmission in one propagation mode satisfies Equation (28) below, for $Q_{margin}$ in transmission in many propagation modes to satisfy Expression (29) below, it is preferable to satisfy Expression (31) below, for example, in the case of Equation (30) below, or it is preferable to satisfy Expression (33) below, for example, in the case of Equation (32) below.

$$10 \log_{10} Q_{margin1} = 3 \quad (28)$$

$$10 \log_{10} Q_{margin1} \ge 1 \quad (29)$$

$$10 \log_{10} Q_{FEC} = 6.5 \quad (30)$$

$$\frac{P_{signal}}{S^2} \le PSR_{max} = \frac{1}{XT_\mu} 10^{\frac{-6.5}{10}} (10^{\frac{-1}{10}} - 10^{\frac{-3}{10}}) \quad (31)$$

$$10 \log_{10} Q_{FEC} = 8.5 \quad (32)$$

$$\frac{P_{signal}}{S^2} \le PSR_{max} = \frac{1}{XT_\mu} 10^{\frac{-8.5}{10}} (10^{\frac{-1}{10}} - 10^{\frac{-3}{10}}) \quad (33)$$

The above discussed the polarization multiplexing modulation formats to implement modulation on the I-Q plane independently in each of two independent propagation modes, i.e., to implement modulation on the two-dimensional plane individually in the two polarization modes. With use of polarization-switched modulation formats (cf. H. Bulow et al., OFC 2011, paper 0Th01 (Non Patent Document 4)) to implement modulation on a four-dimensional space using a total of four independent components, the I component of the first polarization mode, the Q component of the first polarization mode, the I component of the second polarization mode, and the Q component of the second polarization mode, while handling the two polarization modes together, the frequency utilization efficiency that can be realized with equal $Q^2$-factor can be improved in comparison with the polarization multiplexing modulation formats, and therefore, it is preferable in the present invention that the modulation formats with PSR being not more than $PSR_{max}$ be the polarization-switched modulation formats.

In the present invention, the larger PSR, the more the multi-level degree of modulation is increased and the more the frequency utilization efficiency is improved. Considering the examples where in the various modulation diagrams the signal light power $P_{signal}$ is assumed to be the maximum power $P_{max}$ in each modulation diagram and where the signal light power $P_{signal}$ is assumed to be the average power $P_{avg}$ in each modulation diagram, a ratio of PSRs of two modulation formats with neighboring multi-level degrees is at most $2^{1/2}/(2^{1/2}-1)$. Therefore, PSR is preferably set at least to be a value of not less than $PSR_{max}(2^{1/2}-1)/2^{1/2}$ which is a value obtained by dividing $PSR_{max}$ by $2^{1/2}/(2^{1/2}-1)$.

Figure 7:
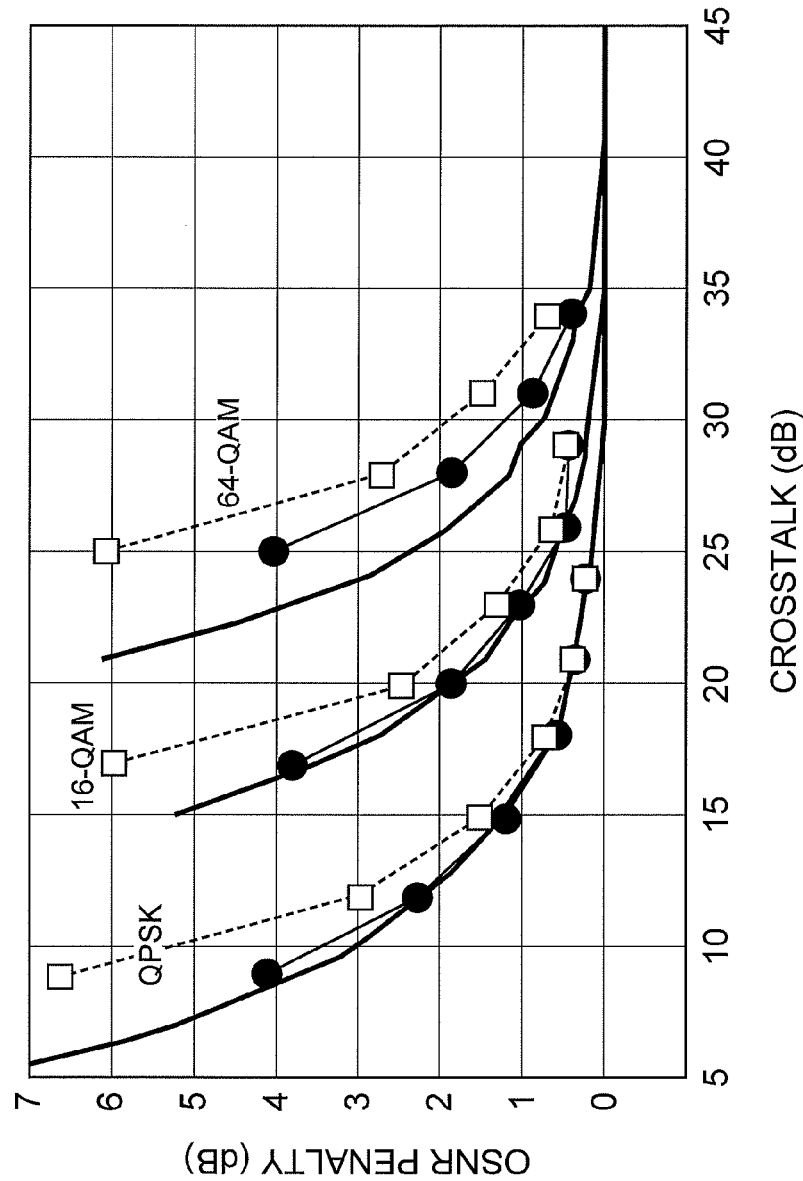
FIG. 7 is a graph showing relations between crosstalk XT and OSNR penalty without consideration to dispersion of crosstalk XT. (The source thereof is Non Patent Document 1)

FIG. 7 is a graph showing relations between crosstalk XT and OSNR penalty without consideration to dispersion of crosstalk XT. FIG. 7 is the figure shown in Non Patent Document 1. In FIG. 7, solid lines represent the results obtained by simulations, and polygonal lines to connect dots and squares are the results obtained by experiments. In FIG. 7, the dispersion of the crosstalk XT is not taken into consideration in the experiments, either, and the transmission quality of signal light was checked in the following manner: incident light is split into two light signals by an optical splitter, one of them is used as signal light, the other as XT light, the XT light is attenuated by an optical attenuator, the two beams are then re-combined, and the transmission quality is checked for signal light after the re-combination.

Figure 8:
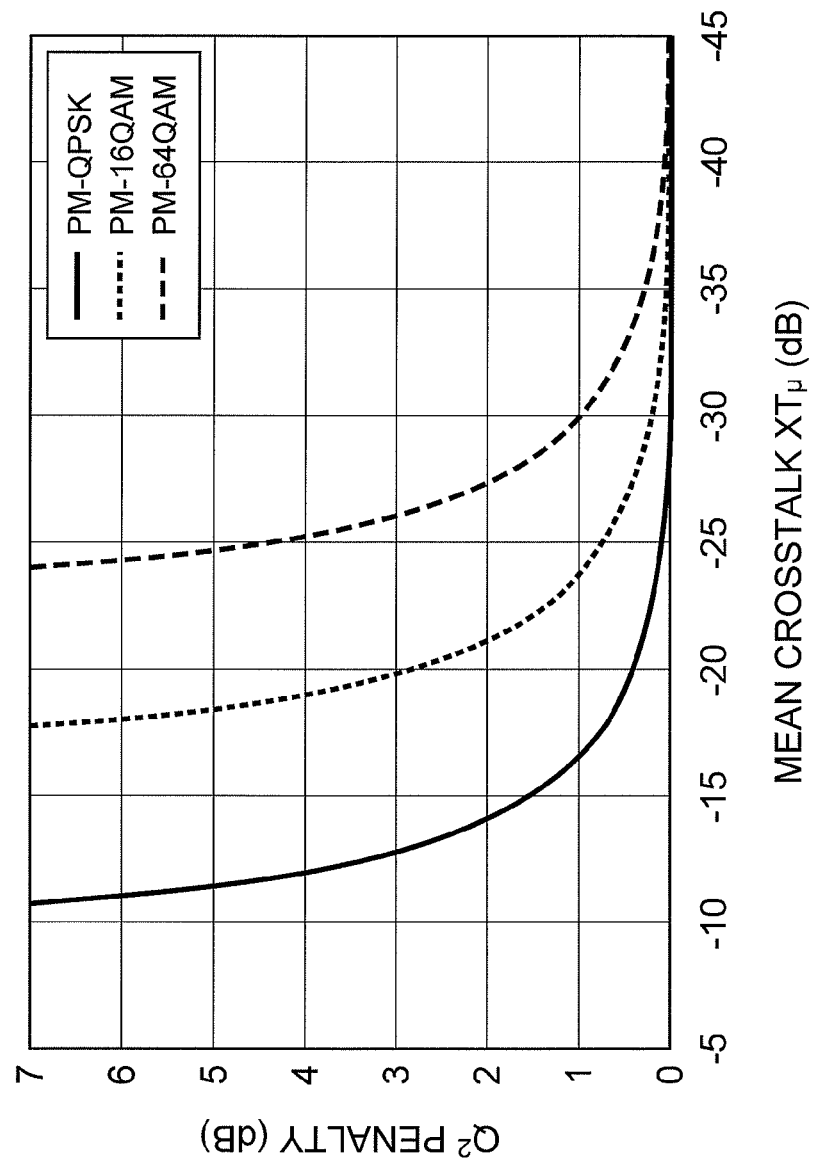
FIG. 8 is a graph showing relations between crosstalk $XT_\mu$ and $Q^2$ penalty with consideration to dispersion of crosstalk XT.

On the other hand, FIG. 8 is a graph showing relations between crosstalk XT and $Q^2$ penalty with consideration to dispersion of crosstalk XT, in the embodiment of the present invention. Since there is a proportional relation between OSNR (Optical Signal-to-Noise Ratio) and $Q^2$, the $Q^2$ penalty takes values equal to those of OSNR penalty. FIG. 8 shows the relations between crosstalk XT and $Q^2$ penalty obtained by Eq (16) above with consideration to the dispersion of crosstalk XT, in the same condition as FIG. 7 (on the assumption of $Q_{noise+xt}$ of 9.8 dB equivalent to the bit error rate $10^{-3}$ assumed in Non Patent Document 1).

It is seen by comparison between FIG. 7 and FIG. 8 that the degradation of $Q^2$ penalty in the actual spatial multiplexing optical fibers is greater than that shown in Non Patent Document 1, from the degradation of $Q^2$ penalty against increase of crosstalk XT with consideration to the dispersion of crosstalk XT. The optical transmission system of the embodiment of the present invention realizes the more accurate prediction of the effect of the crosstalk XT on the transmission quality Q-factor and enables transmission according to an appropriate modulation format.

According to the present invention, spatial multiplexing transmission with high-quality and high-usage efficiency of frequency can be easily implemented using the spatial multiplexing optical fiber. Namely, according to the present invention, if a Q-factor when transmitting the signal light in only one propagation mode of the spatial multiplexing optical fiber is checked, appropriate modulation formats for all the propagation modes can be selected from the Q-factor and the mean crosstalk to the one propagation mode to be checked. By this, it is not necessary to individually transmit signal lights in all the propagation modes, check Q-factors of all the individual signal lights, and check appropriate modulation formats each appropriate for the associated one of all the propagation modes.

In the case of the multi-core optical fiber with an arrangement in hexagonal lattice, it is preferable to select a center core as a check target core, which is susceptible to crosstalk. However, in cases of other core arrangements, the check is preferably carried out as to a core having a maximum crosstalk from other cores. In the case of the few-mode optical fiber, the check is preferably carried out as to a propagation mode having a maximum crosstalk from other propagation modes.

What is claimed is:

1. An optical transmission system to perform optical transmission using a spatial multiplexing optical fiber as an optical transmission line for transmission of signal light, comprising:
   the spatial multiplexing optical fiber;
   a transmitting system arranged on one end side of the spatial multiplexing optical fiber, the transmitting system having a light source to emit light, and a modulator to generate the signal light by modulating the light outputted from the light source, in accordance with a predetermined modulation format; and a receiving system arranged on the other end side of the spatial multiplexing optical fiber, the receiving system receiving the signal light from the transmitting system through the spatial multiplexing optical fiber, wherein when a signal light power is defined as $P_{signal}$, the shortest distance between modulation symbols in a modulation diagram showing a signal arrangement of the modulation format, as S, and a signal light intensity ratio PSR between the modulation symbols as $PSR=P_{signal}/S^2$, under conditions that a transmission quality Q-factor necessary for error correction in the optical transmission is $Q_{FEC}$, a margin of the transmission quality Q-factor desired for safety in the optical transmission is $Q_{margin}$, a mean crosstalk to a certain propagation mode of the spatial multiplexing optical fiber is $XT_\mu$, and the Q-factor of the signal light which propagates in only the certain propagation mode light of the spatial multiplexing optical fiber after modulation in accordance with the modulation format, is $Q_{noise}$, the modulator generates the signal light by modulating the light emitted from the light source, in accordance with the modulation format where said PSR falls within the range of not more than $PSR_{max}$ in Equation (1) below and not less than $PSR_{max}(2^{1/2}-1)/2^{1/2}$ $$PSR_{max} = \frac{1}{XT_\mu}\left(\frac{1}{Q_{FEC}^2 Q_{margin}^2} - \frac{1}{Q_{noise}^2}\right). \tag{1}$$

2. The optical transmission system according to claim 1, wherein $Q_{FEC}$ being the transmission quality Q-factor necessary for the error correction satisfies Expression (3) below, and the margin $Q_{margin}$ of the transmission quality Q-factor satisfies Expression (4) below $$10\log_{10} Q_{FEC} \leq 9.8 \tag{3}$$

$$1 \leq 10\log_{10} Q_{margin} \leq 6. \tag{4}$$

3. The optical transmission system according to claim 1, wherein the modulation format after the PSR is set to be not more than said $PSR_{max}$, is a polarization-switched modulation format.

4. The optical transmission system according to claim 1, wherein the signal light power $P_{signal}$ is an average power of the light emitted from the light source.

5. The optical transmission system according to claim 1, wherein the signal light power $P_{signal}$ is an average power of the light emitted from the light source, and wherein the modulation format to be employed is PM-QPSK with said $PSR_{max}$ being not less than 1 and being less than $2^{1/2}/(2^{1/2}-1)$, PM-8PSK with said $PSR_{max}$ being not less than $2^{1/2}/(2^{1/2}-1)$ and being less than 5, PM-16QAM with said $PSR_{max}$ being not less than 5 and being less than 10, PM-32QAM with said $PSR_{max}$ being not less than 10 and being less than 21, PM-64QAM with said $PSR_{max}$ being not less than 21 and being less than 41, PM-128QAM with said $PSR_{max}$ being not less than 41 and being less than 85, PM-256QAM with said $PSR_{max}$ being not less than 85 and being less than 165, PM-512QAM with said $PSR_{max}$ being not less than 165 and being less than 341, or PM-1024QAM with said $PSR_{max}$ being not less than 341.

6. The optical transmission system according to claim 1, wherein the signal light power $P_{signal}$ is a maximum power of the light emitted from the light source.

7. The optical transmission system according to claim 1, wherein the signal light power $P_{signal}$ is a maximum power of the light emitted from the light source, and wherein the modulation format to be employed is PM-QPSK with said $PSR_{max}$ being not less than 1 and being less than $2^{1/2}/(2^{1/2}-1)$, PM-8PSK with said $PSR_{max}$ being not less than $2^{1/2}/(2^{1/2}-1)$ and being less than 9, PM-16QAM with said $PSR_{max}$ being not less than 9 and being less than 17, PM-32QAM with said $PSR_{max}$ being not less than 17 and being less than 49, PM-64QAM with said $PSR_{max}$ being not less than 49 and being less than 85, PM-128QAM with said $PSR_{max}$ being not less than 85 and being less than 225, PM-256QAM with said $PSR_{max}$ being not less than 225 and being less than 377, PM-512QAM with said $PSR_{max}$ being not less than 377 and being less than 961, or PM-1024QAM with said $PSR_{max}$ being not less than 961.

8. An optical transmission system to perform optical transmission using a spatial multiplexing optical fiber as an optical transmission line for transmission of signal light, comprising:

the spatial multiplexing optical fiber;

a transmitting system arranged on one end side of the spatial multiplexing optical fiber, the transmitting system having a light source to emit light, and a modulator to generate the signal light by modulating the light emitted from the light source, in accordance with a predetermined modulation format; and a receiving system arranged on the other end side of the spatial multiplexing optical fiber, the receiving system receiving the signal light from the transmitting system through the spatial multiplexing optical fiber, wherein when a signal light power is defined as $P_{signal}$, the shortest distance between modulation symbols in a modulation diagram showing a signal arrangement of the modulation format, as S, and a signal light intensity ratio PSR between the modulation symbols as $PSR=P_{signal}/S^2$, under conditions that a transmission quality Q-factor necessary for forward error correction in the optical transmission is $Q_{FEC}$, a margin of the transmission quality Q-factor desired for safety in the optical transmission is $Q_{margin}$, a mean crosstalk to a certain propagation mode of the spatial multiplexing optical fiber is $XT_\mu$, and the Q-factor of the signal light, which propagates in only the certain propagation mode of the spatial multiplexing optical fiber after modulation in accordance with a PM-QPSK modulation format as the modulation format, is $Q_{PM-QPSK}$, the modulator generates the signal light by modulating the light emitted from the light source, in accordance with the modulation format where said PSR falls within the range of not more than $PSR_{max}$ in Equation (2) below and not less than $PSR_{max}(2^{1/2}-1)/2^{1/2}$ $$PSR_{max} = \frac{1}{Q_{PM-QPSK}^{-2} + XT_\mu} \frac{1}{Q_{FEC}^2 Q_{margin}^2}. \tag{2}$$

9. The optical transmission system according to claim 8, wherein $Q_{FEC}$ being the transmission quality Q-factor necessary for the error correction satisfies Expression (3) below, and the margin $Q_{margin}$ of the transmission quality Q-factor satisfies Expression (4) below $$10 \log_{10} Q_{FEC} \leq 9.8 \tag{3}$$

$$1 \leq 10 \log_{10} Q_{margin} \leq 6 \tag{4}.$$

10. The optical transmission system according to claim 8, wherein the modulation format after the PSR is set to be not more than said $PSR_{max}$, is a polarization-switched modulation format.

11. The optical transmission system according to claim 8, wherein the signal light power $P_{signal}$ is an average power of the light emitted from the light source.

12. The optical transmission system according to claim 8, wherein the signal light power $P_{signal}$ is an average power of the light emitted from the light source, and
    wherein the modulation format to be employed is PM-QPSK with said $PSR_{max}$ being not less than 1 and being less than $2^{1/2}/(2^{1/2}-1)$, PM-8PSK with said $PSR_{max}$ being not less than $2^{1/2}/(2^{1/2}-1)$ and being less than 5, PM-16QAM with said $PSR_{max}$ being not less than 5 and being less than 10, PM-32QAM with said $PSR_{max}$ being not less than 10 and being less than 21, PM-64QAM with said $PSR_{max}$ being not less than 21 and being less than 41, PM-128QAM with said $PSR_{max}$ being not less than 41 and being less than 85, PM-256QAM with said $PSR_{max}$ being not less than 85 and being less than 165, PM-512QAM with said $PSR_{max}$ being not less than 165 and being less than 341, or PM-1024QAM with said $PSR_{max}$ being not less than 341.

13. The optical transmission system according to claim 9, wherein the signal light power $P_{signal}$ is a maximum power of the light emitted from the light source.

14. The optical transmission system according to claim 9, wherein the signal light power $P_{signal}$ is a maximum power of the light emitted from the light source, and
    wherein the modulation format to be employed is PM-QPSK with said $PSR_{max}$ being not less than 1 and being less than $2^{1/2}/(2^{1/2}-1)$, PM-8PSK with said $PSR_{max}$ being not less than $2^{1/2}/(2^{1/2}-1)$ and being less than 9, PM-16QAM with said $PSR_{max}$ being not less than 9 and being less than 17, PM-32QAM with said $PSR_{max}$ being not less than 17 and being less than 49, PM-64QAM with said $PSR_{max}$ being not less than 49 and being less than 85, PM-128QAM with said $PSR_{max}$ being not less than 85 and being less than 225, PM-256QAM with said $PSR_{max}$ being not less than 225 and being less than 377, PM-512QAM with said $PSR_{max}$ being not less than 377 and being less than 961, or PM-1024QAM with said $PSR_{max}$ being not less than 961.

15. An optical transmission system to perform optical transmission using a spatial multiplexing optical fiber as an optical transmission line for transmission of signal light, comprising:
    the spatial multiplexing optical fiber;
    a transmitting system arranged on one end side of the spatial multiplexing optical fiber, the transmitting system having a light source to emit light, and a modulator to generate the signal light by modulating the light emitted from the light source, in accordance with a predetermined modulation format; and
    a receiving system arranged on the other end side of the spatial multiplexing optical fiber, the receiving system receiving the signal light from the transmitting system through the spatial multiplexing optical fiber,
    wherein when a signal light power is defined as $P_{signal}$, the shortest distance between modulation symbols in a modulation diagram showing a signal arrangement of the modulation format, as S, and a signal light intensity ratio PSR between the modulation symbols as $PSR = P_{signal}/S^2$,
    under a condition that a mean crosstalk to a certain propagation mode of the spatial multiplexing optical fiber is $XT_\mu$,
    the modulator generates the signal light by modulating the light emitted from the light source, in accordance with the modulation format where said PSR falls within the range of not more than $PSR_{max}$ in Equation (5) below and not less than $PSR_{max}(2^{1/2}-1)/2^{1/2}$ $$PSR_{max} = \frac{1}{XT_\mu} 10^{\frac{-6.5}{10}} (10^{\frac{-1}{10}} - 10^{\frac{-3}{10}}). \tag{5}$$

16. The optical transmission system according to claim 15, wherein the modulation format after the PSR is set to be not more than said $PSR_{max}$, is a polarization-switched modulation format.

17. The optical transmission system according to claim 15, wherein the signal light power $P_{signal}$ is an average power of the light emitted from the light source.

18. The optical transmission system according to claim 15, wherein the signal light power $P_{signal}$ is an average power of the light emitted from the light source, and
    wherein the modulation format to be employed is PM-QPSK with said $PSR_{max}$ being not less than 1 and being less than $2^{1/2}/(2^{1/2}-1)$, PM-8PSK with said $PSR_{max}$ being not less than $2^{1/2}/(2^{1/2}-1)$ and being less than 5, PM-16QAM with said $PSR_{max}$ being not less than 5 and being less than 10, PM-32QAM with said $PSR_{max}$ being not less than 10 and being less than 21, PM-64QAM with said $PSR_{max}$ being not less than 21 and being less than 41, PM-128QAM with said $PSR_{max}$ being not less than 41 and being less than 85, PM-256QAM with said $PSR_{max}$ being not less than 85 and being less than 165, PM-512QAM with said $PSR_{max}$ being not less than 165 and being less than 341, or PM-1024QAM with said $PSR_{max}$ being not less than 341.

19. The optical transmission system according to claim 15, wherein the signal light power $P_{signal}$ is a maximum power of the light emitted from the light source.

20. The optical transmission system according to claim 15, wherein the signal light power $P_{signal}$ is a maximum power of the light emitted from the light source, and
    wherein the modulation format to be employed is PM-QPSK with said $PSR_{max}$ being not less than 1 and being less than $2^{1/2}/(2^{1/2}-1)$, PM-8PSK with said $PSR_{max}$ being not less than $2^{1/2}/(2^{1/2}-1)$ and being less than 9, PM-16QAM with said $PSR_{max}$ being not less than 9 and being less than 17, PM-32QAM with said $PSR_{max}$ being not less than 17 and being less than 49, PM-64QAM with said $PSR_{max}$ being not less than 49 and being less than 85, PM-128QAM with said $PSR_{max}$ being not less than 85 and being less than 225, PM-256QAM with said $PSR_{max}$ being not less than 225 and being less than 377, PM-512QAM with said $PSR_{max}$ being not less than 377 and being less than 961, or PM-1024QAM with said $PSR_{max}$ being not less than 961.

21. An optical transmission system to perform optical transmission using a spatial multiplexing optical fiber as an optical transmission line for transmission of signal light, comprising:

the spatial multiplexing optical fiber;

a transmitting system arranged on one end side of the spatial multiplexing optical fiber, the transmitting system having a light source to emit light, and a modulator to generate the signal light by modulating the light emitted from the light source, in accordance with a predetermined modulation format; and a receiving system arranged on the other end side of the spatial multiplexing optical fiber, the receiving system receiving the signal light from the transmitting system through the spatial multiplexing optical fiber, wherein when a signal light power is defined as $P_{signal}$, the shortest distance between modulation symbols in a modulation diagram showing a signal arrangement of the modulation format, as S, and a signal light intensity ratio PSR between the modulation symbols as $PSR = P_{signal}/S^2$, under a condition that a mean crosstalk to a certain propagation mode of the spatial multiplexing optical fiber is $XT_\mu$, the modulator generates the signal light by modulating the light emitted from the light source, in accordance with the modulation format where said PSR falls within the range of not more than $PSR_{max}$ in Equation (6) below and not less than $PSR_{max}(2^{1/2}-1)/2^{1/2}$ $$PSR_{max} = \frac{1}{XT_\mu} 10^{\frac{-8.5}{10}} (10^{\frac{-1}{10}} - 10^{\frac{-3}{10}}). \qquad (6)$$

22. The optical transmission system according to claim 21, wherein the modulation format after the PSR is set to be not more than said $PSR_{max}$, is a polarization-switched modulation format.

23. The optical transmission system according to claim 21, wherein the signal light power $P_{signal}$ is an average power of the light emitted from the light source.

24. The optical transmission system according to claim 21, wherein the signal light power $P_{signal}$ is an average power of the light emitted from the light source, and wherein the modulation format to be employed is PM-QPSK with said $PSR_{max}$ being not less than 1 and being less than $2^{1/2}/(2^{1/2}-1)$, PM-8PSK with said $PSR_{max}$ being not less than $2^{1/2}/(2^{1/2}-1)$ and being less than 5, PM-16QAM with said $PSR_{max}$ being not less than 5 and being less than 10, PM-32QAM with said $PSR_{max}$ being not less than 10 and being less than 21, PM-64QAM with said $PSR_{max}$ being not less than 21 and being less than 41, PM-128QAM with said $PSR_{max}$ being not less than 41 and being less than 85, PM-256QAM with said $PSR_{max}$ being not less than 85 and being less than 165, PM-512QAM with said $PSR_{max}$ being not less than 165 and being less than 341, or PM-1024QAM with said $PSR_{max}$ being not less than 341.

25. The optical transmission system according to claim 21, wherein the signal light power $P_{signal}$ is a maximum power of the light emitted from the light source.

26. The optical transmission system according to claim 21, wherein the signal light power $P_{signal}$ is a maximum power of the light emitted from the light source, and wherein the modulation format to be employed is PM-QPSK with said $PSR_{max}$ being not less than 1 and being less than $2^{1/2}/(2^{1/2}-1)$, PM-8PSK with said $PSR_{max}$ being not less than $2^{1/2}/(2^{1/2}-1)$ and being less than 9, PM-16QAM with said $PSR_{max}$ being not less than 9 and being less than 17, PM-32QAM with said $PSR_{max}$ being not less than 17 and being less than 49, PM-64QAM with said $PSR_{max}$ being not less than 49 and being less than 85, PM-128QAM with said $PSR_{max}$ being not less than 85 and being less than 225, PM-256QAM with said $PSR_{max}$ being not less than 225 and being less than 377, PM-512QAM with said $PSR_{max}$ being not less than 377 and being less than 961, or PM-1024QAM with said $PSR_{max}$ being not less than 961.

* * * * *